P. H. THOMAS.
REGULATION OF SYSTEMS OF ELECTRICAL DISTRIBUTION.
APPLICATION FILED SEPT. 27, 1905.
1,110,590.
Patented Sept. 15, 1914.
2 SHEETS—SHEET 1.
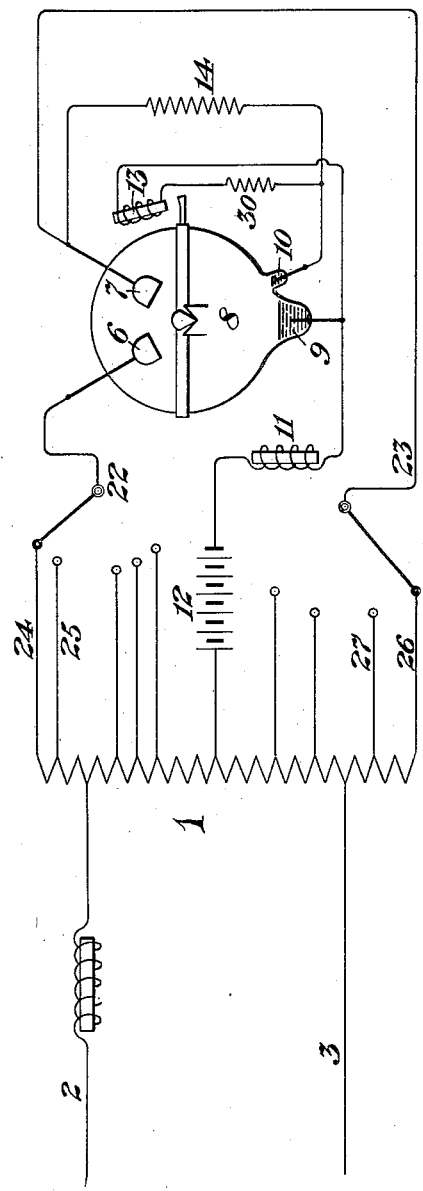
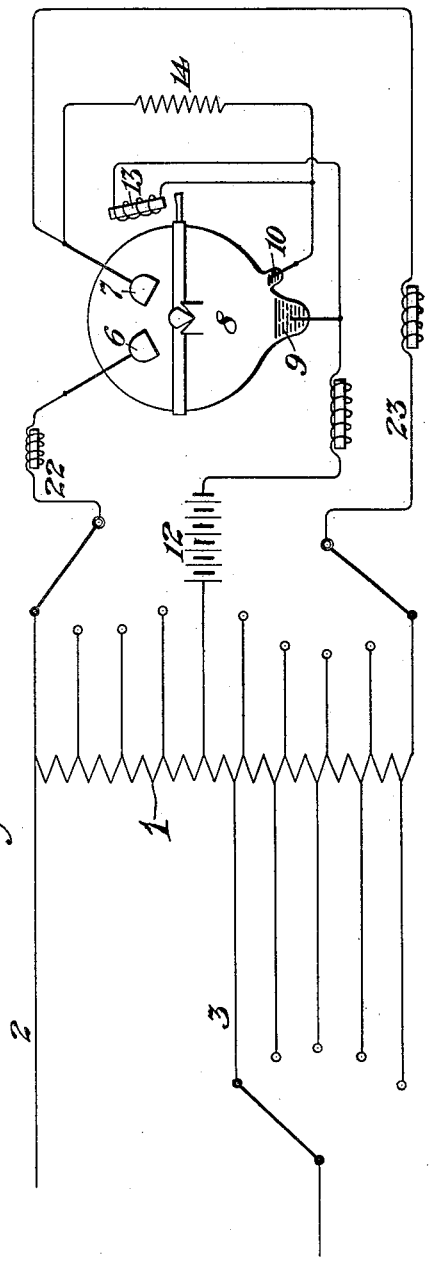

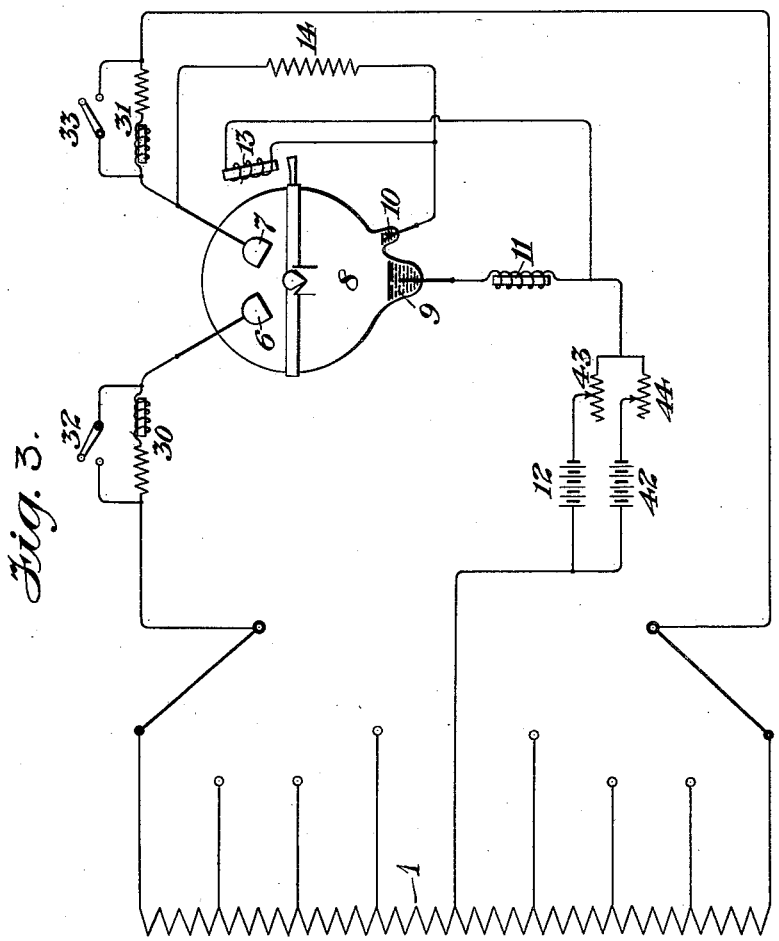

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

REGULATION OF SYSTEMS OF ELECTRICAL DISTRIBUTION.

1,110,590.     Specification of Letters Patent.     Patented Sept. 15, 1914.

Continuation of application Serial No. 161,282, filed June 13, 1903. This application filed September 27, 1905. Serial No. 280,256.

*To all whom it may concern:*

Be it known that I, PERCY H. THOMAS, a citizen of the United States, and resident of Montclair, county of Essex, State of New Jersey, have invented certain new and useful Improvements in Regulation of Systems of Electrical Distribution, of which the following is a specification.

In an application for Letters Patent of the United States filed March 30, 1905, Serial Number 252,797, I have described a converter outfit suitable for charging storage batteries from a single-phase alternating current source together with means for securing a wide range of current variation.

It is found that in certain cases it is desirable as well to provide means for charging from the same apparatus at different times a considerable number of batteries or other direct current translating devices of different voltages.

It is the object of the present invention to provide means by which a wide range of voltage may be delivered to the work circuit. This I accomplish by means of certain loops tapped out of suitable turns in the auto or other transformer through which the energy is supplied and by either altering the number of turns from which the primary voltage is supplied or withdrawing energy from varying numbers of turns for energizing the converter I may vary the delivery of direct current.

The present invention may be utilized, for example, in cases where the normal line voltage is less than the maximum voltage required between the positive electrodes of the converter. In such cases I may employ a number of steps comparatively large in connection with one lead and comparatively small steps at the other lead by which it is possible to slightly vary the voltage by steps throughout a comparatively wide range.

The invention may also be applied to cases where it is desired to supply a comparatively low direct current voltage from a high alternating current voltage, in which case I provide various loops to which may be connected the several leads from the positive electrodes so that while the number of turns connected with the line remains unchanged, the voltage of the converter is varied and controlled. In some cases such loops are symmetrically arranged so that exactly equal voltages are impressed upon the circuit between the negative electrode and each positive electrode; while in other cases, where finer gradations are required, I may either provide unequal voltage steps upon the two sides of each auto-transformer or may step the positive leads unequally, as may be found most desirable. The maintaining or sustaining coil on the negative side of the converter tends to equalize in the direct current side any inequalities of voltage thus produced. In still other cases where an unusually wide range of voltage is required in the work circuit, especially where a fine gradation of steps is necessary I utilize various loops both for connection to the leads of the positive electrodes and also for varying the point of application of the supply voltage.

It will be understood that the regulating devices may be placed on the supply side of the circuit or in the circuit between the transformer or converter. In which different positions they perform their functions somewhat differently as will be understood by those skilled in the art. The described different arrangement of the regulating devices will be depended upon to suit different conditions of service.

These various embodiments of the invention are diagrammatically illustrated in Figures 1, 2, and 3 of the drawing.

In Fig. 1, 1 is an auto transformer supplied from leads 2 and 3 as shown, connected with a source of alternating current. 8 is a vapor converter having anodes 6 and 7 connected to the opposite sides of the winding 1, and 9 is the cathode of the converter and 10 a supplemental starting electrode. The cathode 9 is connected through a maintaining or sustaining coil 11 with an intermediate point of the transformer winding 1, a storage battery 12 or other receiving apparatus being interposed in the circuit from the negative electrode. At 13 is shown a tilting magnet, the function of which is now well understood, the same being adapted to tilt the converter so as to bring temporarily into contact the electrodes 9 and 10 and afterward release the converter so as to separate them for starting the apparatus. In the circuit with the tilting magnet is a resistance, 34, the resistance and the coil being connected between the electrodes 9 and 10. The electrode 10 is connected by a resistance 14 with the lead of the electrode 7. In this and the other figures of the drawing it will be understood that this method of obtaining direct current is applicable not only to storage batteries but also to motors or other translating devices. For the purposes of this invention I connect the supply mains 2 and 3, and the vapor converter by means of taps on the auto transformer so that a ready adjustment of voltage or ratio may be obtained.

In Fig. 1, steps corresponding generally to those described are arranged on the converter side of the auto-transformer, and suitable switch arms are provided for making such connections with the various loops as will vary the voltage impressed upon the converter while the number of turns in the transformer which are connected with the line remains unchanged. It is found advantageous in some cases to make the loops represented in Fig. 1 at opposite ends of the auto-transformer irregular. For example, the transfer of the switch-arm 22 in Fig. 1 from the terminal loop, 24, to the succeeding loop, 25, may be assumed to represent a five per cent. reduction in potential supplied to the converter; while the transfer of the switch-arm, 23, from the terminal loop, 26, to the succeeding loop, 27, may be assumed to represent a ten per cent. reduction in potential supplied to the converter. By moving the switch-arm 22 alone, as described, we can secure a fifteen per cent. reduction and so on. on the direct current side of the circuit. On the other hand by moving the switch-arm 23 alone in the manner described we can secure a ten per cent. reduction in the voltage on the direct current side of the circuit and by moving both switch arms from the terminal loop to the next succeeding loop we can secure a fifteen per cent. reduction and so on. By making the loops represent irregular reductions, as described, it is possible to secure a finer gradation in the variations of voltage than if all the loops were made to represent exactly equal changes in the potential.

In Fig. 1 the receiving device is represented as a storage battery, 12, and the maintaining or sustaining coil is represented at 11 as before. A resistance, 30, may be inserted in the circuit of the tilting coil 13 for controlling the current.

In Fig. 2 I illustrate an invention somewhat varied from the form shown in Fig. 1, some of the loops being shown on the supply side of the circuit and others on the converter side. By virtue of this arrangement a still greater range is secured than by either of the other arrangements alone and in some instances it may be desirable to provide means for securing such a wide range. The action of the device represented in the figure is obvious from the description given in connection with Fig. 2.

It will be understood that in place of the storage batteries illustrated in the various figures of the drawing other translating devices, such as motors, may be employed, and it is especially desired that the invention be not limited to the use of storage batteries alone as the translating device in the receiving circuit.

In Fig. 3 I illustrate particularly the employment of impedances, as 30, 31, in the leads to the positive electrodes 6 and 7 of a vapor converter 8, together with means for securing voltage adjustment by any or all of the devices illustrated in Figs. 1 and 2. In connection with the said impedances are provided short-circuiting devices, 32 and 33, for use in case of need or convenience. The functions of the impedances 30, 31 which are shown as inductances and resistances in series are to serve the purposes of regulating, steadying and sustaining the preventing of short circuits and such purposes.

In the receiving circuit I represent a plurality of storage batteries, 12 and 42 together with means for introducing them into the said receiving circuit with or without resistances, 43, 44, these storage batteries or their equivalent may be used together or separately in the receiving circuit.

The resistances, 43, 44, are made adjustable as shown and their function is to supply the smallest additional regulation of the current, by making the major adjustment by means of the loops in the auto-transformer and supplying the minor adjustment by variations in the amount of resistance introduced at 43 and 44. By doing this I secure an efficient and finely graduated control over a wide range of voltage.

The invention herein described may be applied not only to systems of single-phase distribution but also to systems of distribution by polyphase currents.

I claim as my invention:

1. The combination with a vacuum rectifier including a plurality of anodes and a cathode in an exhausted container, an alternating current transformer winding acting as a supply therefor, a direct current work circuit and a connection from said cathode through said direct current work circuit to an intermediate point of said winding, of a series of taps near the terminals of said windings relatively widely spaced near one terminal and relatively narrowly spaced near the other, and means for connecting said anodes respectively to the two sets of taps independently and means traversed by currents from both anodes for steadying the resultant current flowing from the two anodes.

2. The combination with a vacuum rectifier, including a suitable negative electrode and suitable positive electrodes, of a source consisting of a transformer winding, a direct current work circuit, a connection from the negative electrode through said direct current work circuit to the middle point of said transformer winding and connections from the positive electrodes to the outer portions of said winding, of means for adjusting the point of connection of one of the leads from the positive electrodes independently of that of the other anode thus producing unbalanced electromotive forces on the two positive electrodes, together with an inductance in the direct current circuit whereby a relatively large quantity of energy is stored from the higher voltage positive, thus steadying the current flow.

Signed at New York, in the county of New York, and State of New York this 25th day of September A. D. 1905.

PERCY H. THOMAS.

Witnesses:
 WM. H. CAPEL,
 THOS. H. BROWN.